Sept. 1, 1925.
W. B. YOUNG
WOOD CARVING MACHINE
Filed June 11, 1923
1,551,861
4 Sheets-Sheet 1
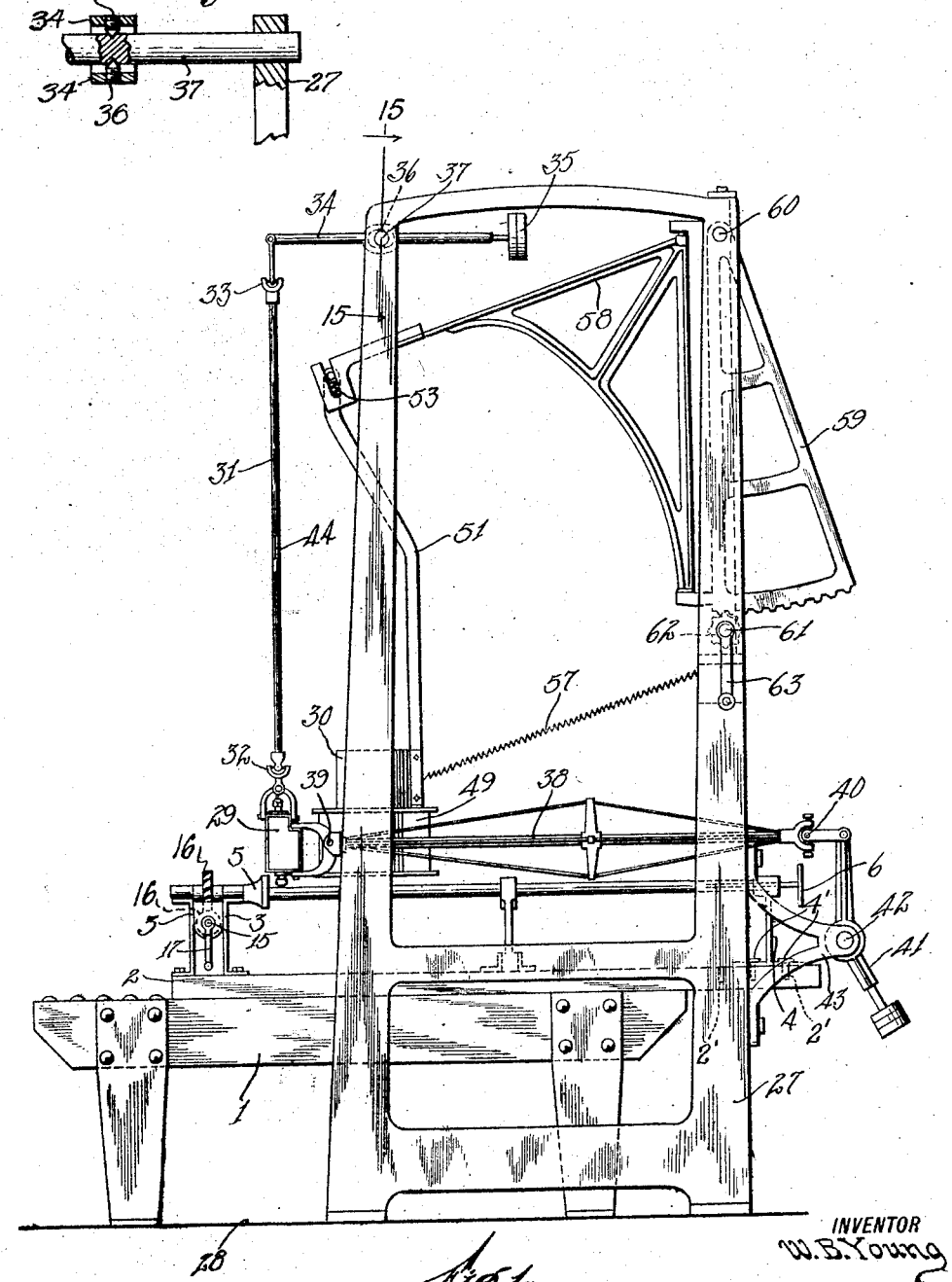
INVENTOR
W. B. Young
BY
Munn & Co.
ATTORNEYS Sept. 1, 1925.  
W. B. YOUNG  
WOOD CARVING MACHINE  
Filed June 11, 1923  
1,551,861  
4 Sheets-Sheet 2
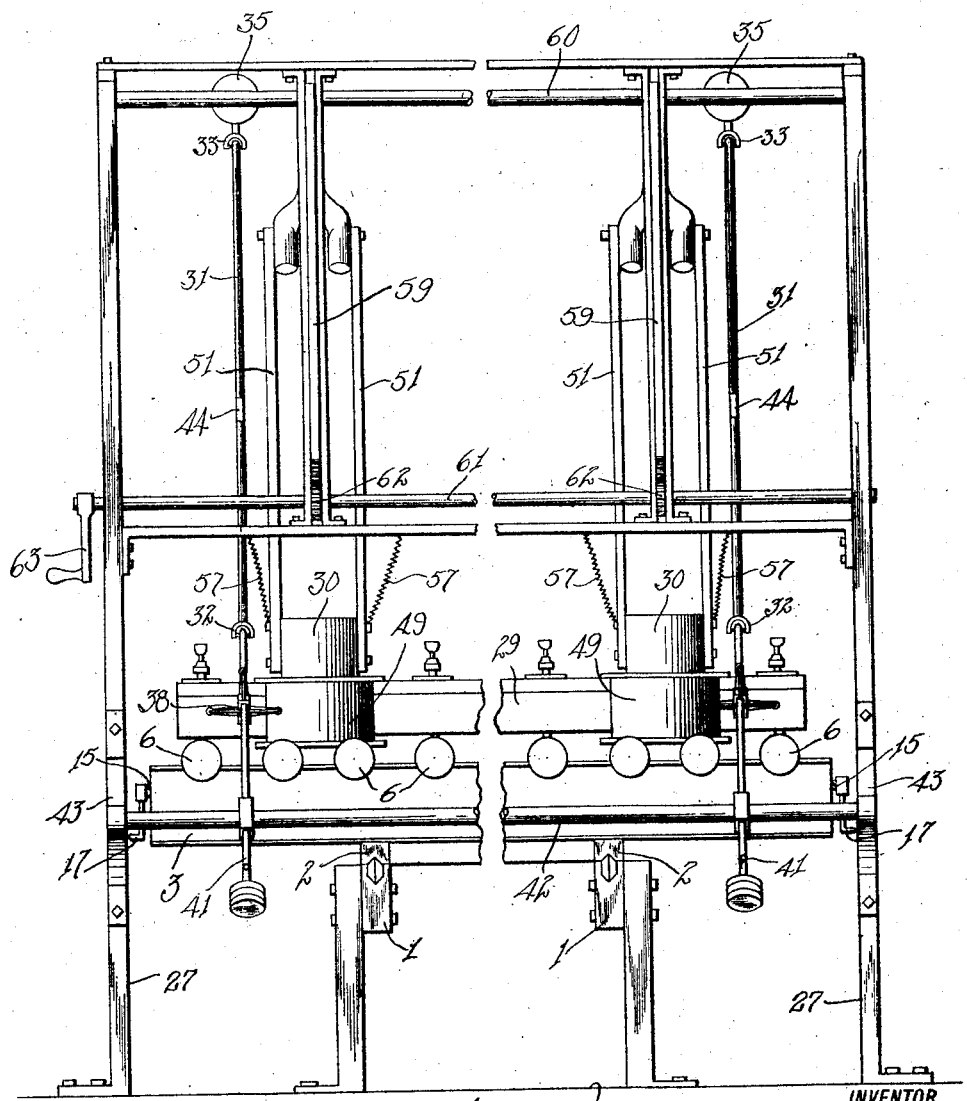

Sept. 1, 1925.                 W. B. YOUNG                    1,551,861
                          WOOD CARVING MACHINE
                          Filed June 11, 1923         4 Sheets-Sheet 3
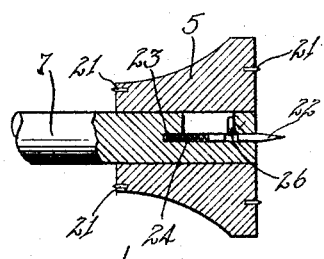
Fig. 8.
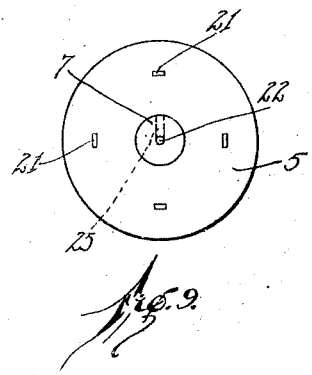
Fig. 9.
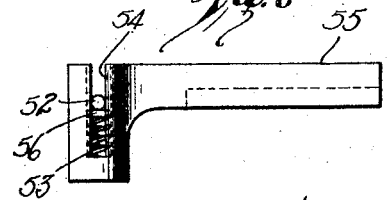
Fig. 6.
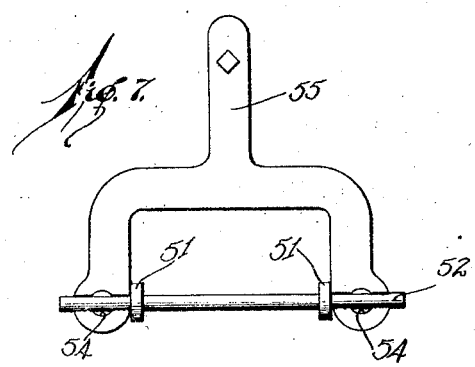
Fig. 7.
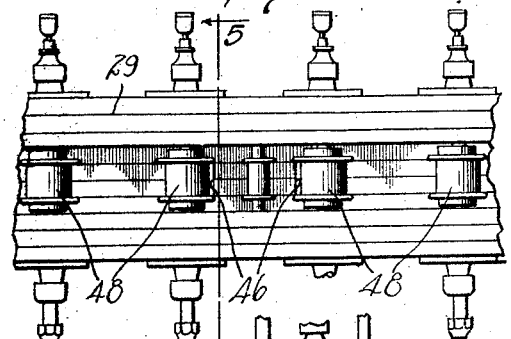
Fig. 3.
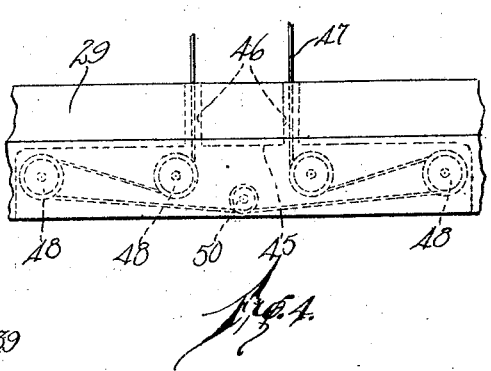
Fig. 4.
Fig. 5.
INVENTOR
W. B. Young
BY Munn & Co.
ATTORNEYS

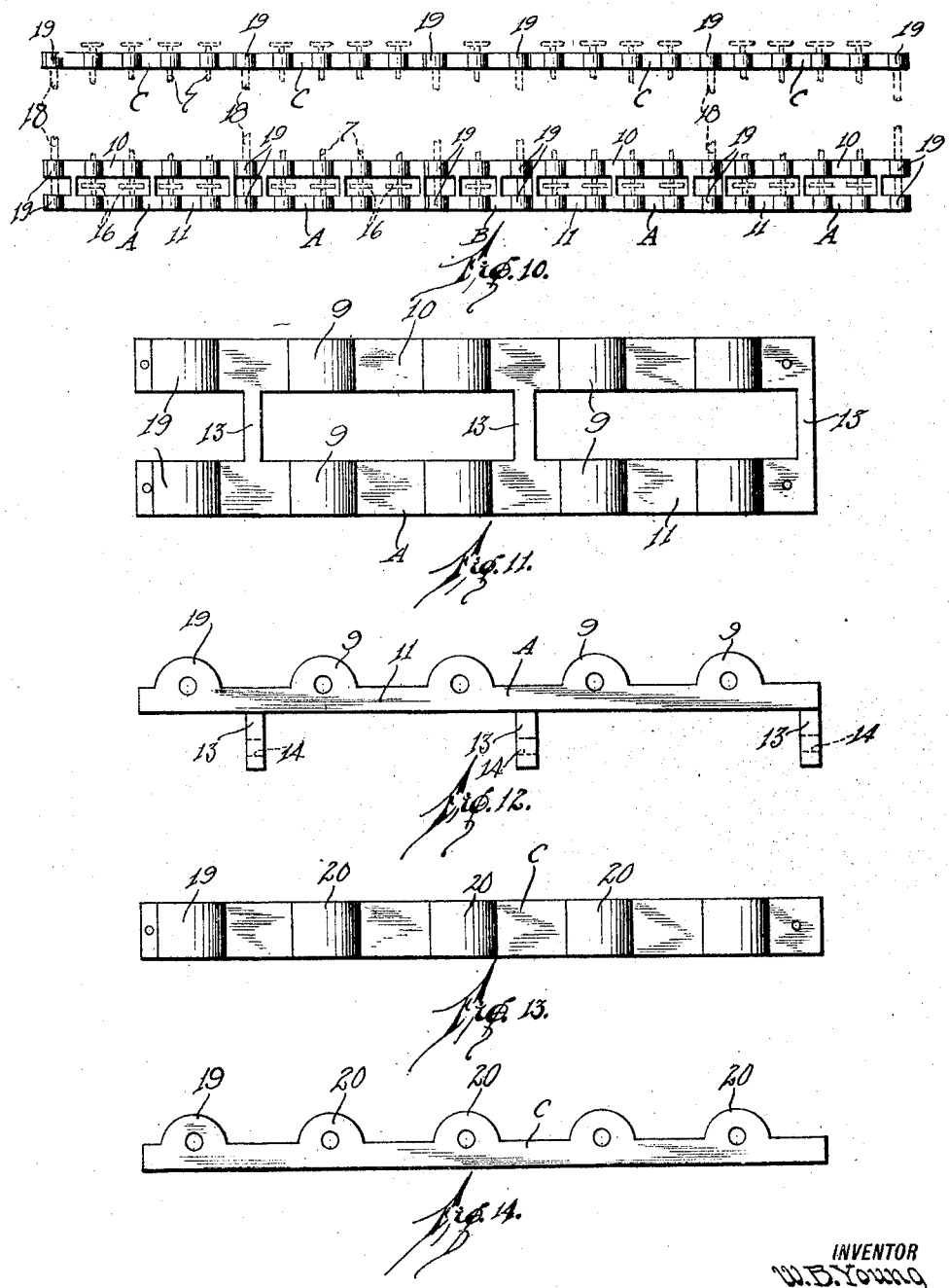

Patented Sept. 1, 1925.

1,551,861

UNITED STATES PATENT OFFICE.

WILLIAM B. YOUNG, OF CHICAGO, ILLINOIS.

WOOD-CARVING MACHINE.

Application filed June 11, 1923. Serial No. 644,730.

*To all whom it may concern:*

Be it known that I, WILLIAM B. YOUNG, a citizen of the United States, and a resident of Chicago, in the county of Cook and State of Illinois, have invented a new and useful Improvement in Wood-Carving Machines, of which the following is a full, clear, and exact description.

The principal object of my invention is to provide an improvement over that form of device shown in my Patent No. 1,439,215, patented December 19, 1922. In said patent I showed a machine that is adapted to carry a number of pieces of work, and which has a spindle carrying frame that has a universal movement with respect to the work, whereby the work can be cut into various patterns. The spindle carrying frame in my Patent No. 1,439,215 is constructed of metal and I have found that the frame expands when used for a length of time, due to the fact that the frame becomes heated. When the machine is left to stand idle for an hour or more, the frame cools and contracts. When the machine is again started, the cutters are not disposed in the same position as they were formerly and will therefore not cut the work in the proper manner. With sixteen pieces of work, it will be readily apparent that this is a great disadvantage. I have found that by making the spindle carrying frame of laminated wood, the frame will not expand or contract due to the differences in temperature. The principal object of this invention is to provide a spindle carrying frame that will not contract or expand when subjected to various temperatures.

A further object of my invention is to provide a novel means for raising or lowering all of the motors, together with the pulleys that actuate the spindles, the raising and lowering mechanism being actuated by a single crank.

A further object of my invention is to provide a device of the type described in which the entire mechanism is supported by a frame, thereby reducing the vibration of the machine, due to external disturbances, to a minimum.

A further object of my invention is to provide a device of the type described in which the motor carrying brackets are resiliently supported.

A further object of my invention is to provide a device of the type described which has improved means for permitting the ready movement of the spindle carrying frame into any position with respect to the support.

A further object of my invention is to provide a device of the type described that has a novel work centering prong for centering the work with respect to the work engaging heads.

Other objects and advantages will appear in the following specification, and the novel features of the invention will be particularly pointed out in the appended claims.

My invention is illustrated in the accompanying drawings, forming part of this application, in which Figure 1 is a side elevation of the device, Figure 2 is a rear elevation of the device, Figure 3 is an elevation of a portion of the spindle carrying frame, Figure 4 is a plan view of Figure 3, Figure 5 is a section along the line 5—5 of Figure 3, Figure 6 is a side elevation of another portion of the device, Figure 7 is a plan view of Figure 6, Figure 8 is a vertical section through another portion of the device, Figure 9 is a front elevation of Figure 8, Figure 10 is a diagrammatic view of the means for supporting the work, Figure 11 is a plan view of one of the sections shown in Figure 10, Figure 12 is a side elevation of the form of the device shown in Figure 11, Figure 13 is a plan view of another one of the sections shown in Figure 10, Figure 14 is a side elevation of the form of the device shown in Figure 13 and Figure 15 is an enlarged sectional view along the line 15—15 of Figure 1.

In carrying out my invention, I provide a support indicated generally at 1, and a work carrying frame 2 that is slidably supported by the frame 1 (see Figure 1). The support 1 and the frame 2 have been previously described in my Patent No. 1,439,215 and therefore need no further description. Channel irons 3 are secured to the front end of the frame 2 and extend across the entire length thereof. An I-beam 4 is secured to the rear end of the frame 2 and also extends across the entire length thereof. The I-beam 4 is adjustable toward and away from the channel irons 3. The frame 2 has threaded bores 2' which are adapted to receive screws 4'. In this way the I-beam 4 is secured in adjusted position.

The channel irons 3 and the I-beam 4 carry face plates 5 and adjusting screws 6. The face plates 5 and the adjusting screws 6 are adapted to hold the work (not shown) therebetween. The plates 5 are mounted upon stub shafts 7 (see Figure 8) that in turn are rotatably disposed in bearings 9. In Figures 10 to 12 inclusive, I have shown the bearings 9. It will be noted that a number of these bearings are formed in a single casting, indicated generally at A (see Figure 11). The casting comprises two side bars 10 and 11 that are adapted to be supported by the tops of the channel irons 3. The bars 10 and 11 are connected to each other by lugs 13. The lugs have openings 14 through which an actuating rod 15 is rotatably disposed. The rod 15 is connected to the shafts 7 by means of gears 16. Figure 1 shows the gears 16 as being mounted on the rod 15 and stub shafts 7, and in mesh with each other. A rotation of the crank 17 will rotate the rod 15 so as to rotate the face plates 5. In the present form of the device I have shown four castings A, two of them being disposed on each side of a central casting B (see Figure 10). The castings A disposed on one side of the casting B are identical with the castings A disposed on the opposite side, except that the castings on the opposite side are reversed in their position. Each of the castings A is adapted to carry four stub shafts 7 and one tie rod 18. It is obvious that the castings can be fashioned to carry any number of shafts 7 other than shown in the present form of the device, without departing from the spirit and scope of the invention.

The castings A and B are secured to the channel irons 3 by any means, such as bolts. I have found that by making one casting carry a plurality of alined bearings 9, that the bearings 9 can be more readily assembled to the device and in a far shorter time than could be done if a separate bearing was bolted to the channel irons 3 for each shaft 7. In fact, in the form of the patented device, it is extremely hard to aline the bearings on the front and back of the channel irons so that they freely support the shaft 7. When the front and back bearings are cast in one piece, it will be obvious that the bearings are alined before they are secured to the channel irons 3. This construction not only saves a great deal of time in securing the bearings to the channel irons 3, but forms a novel means for alining the bearings before they are secured to the channel irons. The side bars 10 and 11, the bearings 9, and the lugs 13 can be readily cast in a single piece. After the casting is made, it is a very easy matter to drill openings through the alined bearings, this being done by a single drill. The drilling of the openings in the alined bearings in one operation by a single drill assures the operator that the alined bearings will be able to readily carry one of the shafts 7.

The castings A have lugs 19 that are adapted to carry the tie rods 18. Each casting A is adapted to carry one tie rod 18. The casting B has two sets of lugs 19, and is adapted to carry two tie rods 18. The castings C, shown in Figure 13, also carry lugs 19, and are adapted to receive the free ends of the tie rods 18 and carry bearings 20 that are adapted to carry the adjusting screws 6. The castings C are secured to the I-beam 4 and are positioned with respect to the castings A so as to aline the lugs 19 and the bearings 20 with the rods 18 and the bearings 9 of the castings A.

The work is received between the face plates 5 and the adjusting screws 6. In Figures 8 and 9 I have shown enlarged detail views of one of the face plates. It will be noted that the plate has prongs 21 in both of its ends, these prongs being adapted to embed themselves in the work so as to secure the work to the face plate. A rotation of the face plate 5 will rotate the work. The work usually has a bore disposed at each end thereof, these bores being adapted to receive a center pin 22 and the end of the adjusting screw 6. It is customary to hammer the work upon the face plate 5 so as to embed the prongs 21 in the work. In many cases the bore in the work is not sufficiently long to readily receive the center pin 22. When the work is hammered upon the face plate 5, the entire force of the blow is carried by the center pin 22 if the center pin is longer than the bore in the work. Often times the work is broken and it is necessary to make use of a new piece. In Figures 8 and 9, I have shown a novel means for preventing the breaking of the work. The center pin 22 is slidably mounted in a bore 23 of the shaft 7. A spring 24 yieldingly engages with the pin 22 and tends to force the pin out through the opening 23. A slot 25 communicates with the bore 23 see Figure 8 and determines the movement of a projection 26 that is integral with the pin 22 and that is slidably received in the slot 25. With this construction when the work is hammered upon the face plates 5 and the pin 22 engages with the inner ends of the bore in the work, further movement of the work toward the face plates will merely move the pin 22 inwardly against the tension of the spring 24. In this way the entire force of the hammer blows is not carried by the pin.

The projection 26 prevents the spring 24 from projecting the pin 22 out of the bore 23.

Thus far I have described the improvements in the work carrying part of the device. The cutter carrying mechanism and the means for actuating the cutters are carried by a frame 27, the frame being supported independently of the support 1 by means of the supporting surface 28. In many wood carving machines where the cutters and the work are carried by the same frame, vibration of the cutters loosens the working parts to such an extent that the work is not accurately cut so as to closely resemble the pattern. By supporting the cutters and the cutter actuating means on a frame that is independent of the support 1, I provide a construction that is adapted to operate efficiently for a greater length of time, since all of the vibration of the cutters is absorbed by the frame 27 and not by the support 1. In my Patent No. 1,439,215, I showed the means for carrying a spindle carrying frame 29 as being attached to the ceiling of the room in which the device is disposed. I also showed the motor supporting means as being carried by the wall. The frame 27 in the present device is adapted to support both the spindle carrying frame and the motors 30. When the spindle carrying frame and the motors 30 are carried by the ceiling and wall of the room, the vibration of the ceiling and wall, due perchance to vibration caused by machinery in adjacent rooms, would cause the spindle carrying frame to vibrate to such an extent that accurate cutting was made very difficult. The mounting of the spindle carrying frame and the motor on the frame 27 obviates this disadvantage.

The means for carrying the frame 29 is clearly shown in Figures 1 and 2. The frame is carried by vertically extending rods 31 that have a universal connection at 32 with the frame and a universal connection at 33 with a balanced arm 34. In the present form of the device a plurality of rods 31 is provided so as to support the frame 29 throughout its entire length. The weights 35 balance the frame 29 and permit the frame to be moved up and down at will. It will further be noted from Figure 1 that the arm 34 is pivotally connected at 36 to a rod 37 that is carried by the frame 27. The arm 34 is adapted to swing with respect to the rod 37. The rod 37 is rotatably mounted on the frame 27 and permits the arm 34 to be swung in a vertical plane. The pivot point 36 and the fact that the rod 37 is journalled in the frame 27 gives the arm 34 a universal movement. The frame 29 can be moved laterally with respect to the frame 2, the arms 34 merely pivoting about their pivot points 36 so as to permit this movement. In my Patent No. 1,439,215, the rods 31 were swung from their vertical position when the frame 29 was moved laterally. The construction of the arm 34 in the present device obviates this disadvantage.

The frame 29 is also adapted to move in a horizontal plane. The connecting rods 38 permit the frame 29 to be moved in a horizontal plane. The rods 38 have a universal connection at 39 with the frame 29 and a universal connection 40 with a balanced arm 41. The connecting rods 38 and the arms 41 are identical with the construction disclosed in my Patent No. 1,439,215, and therefore need no further description. In the patented device No. 1,439,215, the arms 41 are carried by a rod 42 that in turn is mounted in brackets 43, the brackets being carried by the wall of the room in which the device is disposed. In the present form of the device I have shown the brackets 43 as being connected to the frame 27 instead of to the wall. The rods 31 are provided with a non-circular portion 44 which is adapted to receive a wrench, whereby the rod may be rotated so as to lengthen or shorten the distance between the universal joints 32 and 33. The rod 31 has a right handed thread that is received in the socket of the universal joint 33 and a left handed thread that is received in the universal joint 32. A rotation of the rod 31 in either direction will increase or decrease the distance between the universal joints 32 and 33. A fine adjustment is assured from this construction.

The spindle carrying frame 29 itself is of novel construction and has a distinct advantage over the form disclosed in the patented device No. 1,439,215. The frame 29 is shown in Figures 3 to 5 inclusive. The frame disclosed in the patented device No. 1,439,215 is made of metal and is susceptible to variation of temperature. When the machine is running for a considerable length of time, the frame expands, due to the heat, so as to space the cutters at the end of the frame as much as a quarter of an inch further away from the pattern engaging tool. If the machine is now left to stand idle for an hour, the frame 29 will cool, thereby moving the end cutters into their former position. It will readily be seen that there will be as much as a quarter of an inch variation between the place where the end cutters formerly engaged with the work and the place where the end cutters now engage with the work.

To overcome this disadvantage, I make the frame 29 of wood that is not adapted to expand or contract when heated or cooled. Furthermore, I make the frame 29 of laminated wood, whereby the strength of the frame is greatly increased. In the present form of the device I have shown four layers of wood glued together and having recesses cut therein. Each of these recesses is adapted to receive the pulleys of four of the spindles. I then dispose a number of plies on the top and bottom of the four plies, thus making a frame of the height shown in Figure 5. The frame 29 is provided with openings 46 (see Figure 4). These openings communicate with the recesses 45 and permit the belts 47 that connect the pulleys 48 with the large pulleys 49, to operatively connect the spindles with the pulleys. I have shown an idler pulley 50 that keeps the belt from contacting with the center pulleys 48. The construction of the spindles is identical to the construction disclosed in my patented device No. 1,439,215 and therefore needs no further description. In the present form of the device I have shown four spindles as being operatively connected to each pulley 49.

The motors in the patented device No. 1,439,215 have to be raised separately when it is desirous of disposing the pulleys 49 at a higher elevation. In the present form of the device I have shown means for accomplishing this purpose. It will be noted from Figures 1 and 2 that the motors 30 are carried by arms 51, these arms being connected to a rod 52 (see Figure 7), the rod in turn being resiliently supported by springs 53. The spring 53 is disposed in a recess 54 of a casting 55. The rod 52 rests upon a disc 56. The motors 30 are resiliently supported by this construction and are not caused to vibrate when the machine is running. Springs 57 connect the arms 51 with the frame 27 and yieldingly hold the pulley 49 in engagement with the belt 47. The casting 55 is secured to a bracket 58 that in turn is pivotally secured to a sector 59. The sector 59 is pivotally carried by a shaft 60 that in turn is secured to the frame 27. The bracket 58 is adapted to swing with respect to the sector 59 so as to permit the motors 30 and pulleys to move laterally when the frame 29 is moved. A shaft 61 is rotatably carried by the frame 27 and is operatively connected to the sectors 59 by means of gears 62, whereby rotation of the shafts 61 will swing all of the sectors 59 as a unit. In this manner all of the motors and pulleys are raised as a unit. A crank 63 is secured to the free ends of the shafts 61. This construction results in a great saving of time, since now a mere rotation of the shafts 61 will raise or lower all of the motors simultaneously, whereas in the patented device No. 1,439,215, each of the motors has to be raised by itself.

From the foregoing description of the various parts of the device, the operation thereof may be readily understood. The device may be readily adjusted to carry work of various sizes. The I-beam 4 may be moved toward or away from the channel irons 3 so as to permit the face plates 5 and adjusting screws 6 to carry small or large pieces. In case the work is large in diameter, the motors 30 can be raised by merely actuating the crank 63. The spindle carrying frame 29 may be raised or lowered, since it is balanced by means of the balanced arms 34 and 41. The frame 29 has more freedom in its movement and can be moved to almost any position if the operator so desires. When the portion of the work disposed adjacent to the face plates 5 has been cut, the frame 2 may be moved so as to bring another portion of the work into a position beneath the frame 29. The rods 31 can be adjusted independently of each other so as to raise or lower either end of the frame with respect to the other. The machine can be run for an indefinite length of time without causing the frame 29 to expand from heat, since the frame is made of wood instead of metal. The machine can consist of as few or as many units as desired other than the four units that I have disclosed in the present application. The machine is very simple to operate. The only movement the operator needs to do in cutting the work is to move the frame 29 in accordance with the pattern and to rotate the work by means of the cranks 17 when the portion of the work disposed directly beneath the frame has been finished.

One of the principal features of the device is to mount the cutter mechanism on one frame and to mount the work carrying mechanism on another frame, these two frames being independent of each other. The vibration of the cutters will therefore not be transmitted to the work carrying frame.

I have found that in some of the standard wood carving machines, the operator, in many instances, has to assume awkward positions when carving certain pieces of work, as for example, when the work extends a great distance beyond the front of the machine. With the present device, the operator can move the spindle carrying frame from in back of the machine just as readily as from the front of the machine, thus enabling him to cut work that extends beyond the front of the machine.

I claim:

1. In a wood carving machine, a supporting frame, sectors pivotally carried by said supporting frame, and motor carrying frames resiliently supported by said sectors.

2. In a wood carving machine, a supporting frame, sectors pivotally carried by said frame, motor carrying frames carried by said sectors, and means for simultaneously swinging all of said sectors.

3. In a wood carving machine, a supporting frame, sectors pivotally carried by said frame, brackets pivotally carried by said sectors, motor carrying frames resiliently carried by said brackets, and means for simultaneously swinging all of said sectors.

4. In a wood carving machine, a supporting frame, sectors pivotally carried by said frame, motor carrying frames resiliently carried by said sectors, and means for simultaneously swinging all of said sectors, said means comprising a shaft, gears operatively connecting said shaft to said sectors, and a crank for said shaft.

5. In a wood carving machine, a spindle carrying frame, vertically extending rods supporting said frame, a supporting frame, and means connecting said rods to said supporting frame to permit said rods to remain in a vertical position while said spindle carrying frame is being moved in a horizontal plane.

WILLIAM B. YOUNG.